Sept. 11, 1923.  
A. I. FOLSOM  
BATTERY CELL CONTAINER  
Filed Nov. 10, 1921

1,467,577

Inventor  
A. I. Folsom  
By Jack Athley  
Attorney

Patented Sept. 11, 1923.

1,467,577

UNITED STATES PATENT OFFICE.

ALVIN I. FOLSOM, OF DALLAS, TEXAS, ASSIGNOR TO FRENCH BATTERY AND CARBON COMPANY, OF MADISON, WISCONSIN, A CORPORATION OF WISCONSIN.

BATTERY-CELL CONTAINER.

Application filed November 10, 1921. Serial No. 514,159.

*To all whom it may concern:*

Be it known that I, ALVIN I. FOLSOM, a citizen of the United States, residing at Dallas, in the county of Dallas and State of Texas, have invented certain new and useful Improvements in Battery-Cell Containers, of which the following is a specification.

This invention relates to new and useful improvements in battery cell containers.

It is understood that a common practice among manufacturers and dealers of flashlight batteries is to carry in stock a quantity of single cells, which may be assembled to supply batteries of various cell lengths or sizes.

The object of this invention is to provide flexible means for connecting in series a number of single cell containers.

Another object is to connect the containers in such a way that the cells may be packed in a carton in a compact manner for handling and shipping.

Another object is to connect the containers in such a way that will insure the assemblage of cells of the same date of manufacture in a battery.

Another object is to connect the containers in a way such as will insure a proper contact when assembling a battery.

Another object is to so connect the containers that the cells may be easily held in contact in order to test the assembled battery.

A construction designed to carry out the invention will be hereinafter described together with other features of the invention.

Figure 1:
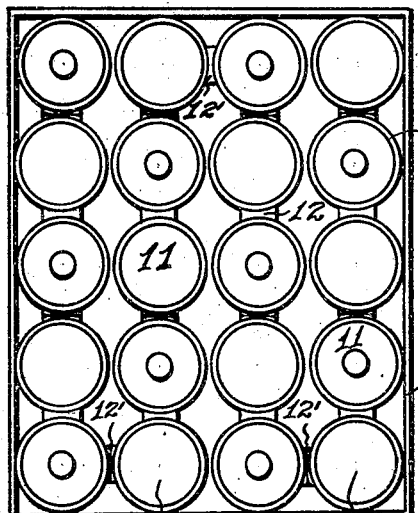
Figure 2:
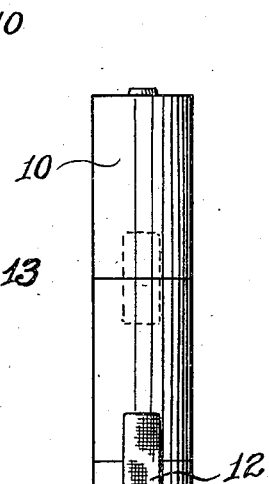
Figure 3:
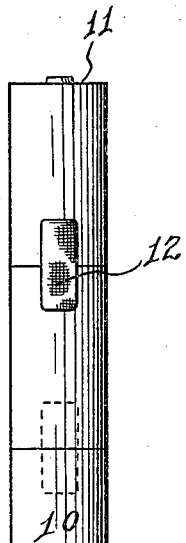
Figure 4:
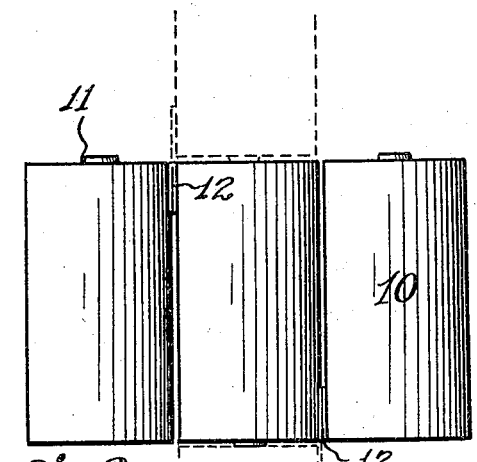

The invention will be more readily understood from a reading of the following specification and by reference to the accompanying drawings, in which an example of the invention is shown and wherein:

Fig. 1 is a plan view of a carton of single cells provided with containers constructed in accordance with my invention, Fig. 2 is an enlarged view in elevation of three cells provided with containers embodying my invention, and showing in dotted lines the proper order of contact the cells will automatically assume when lifted from the carton, Fig. 3 is an elevation of a five cell battery assembled from single cells provided with containers embodying my invention, and Fig. 4 is an elevation of the battery shown in Fig. 3, taken from the opposite side.

In the drawings the numeral 10 designates a plurality of tubular containers, each surrounding a single flashlight battery cell 11. The containers are preferably made of cardboard, but may be made of any other suitable material, as well as in any size desired.

The containers are placed in a series, end to end, and a flexible connector 12 connects each container with the one next it. The connectors may be of any suitable material; however, the preferred form of the invention, as is shown in the drawings, comprises a longitudinal strip of linen or other cloth fabric affixed to the outside of the containers by means of mucilage, glue or the like.

A particular feature of the invention resides in the arrangement of the connectors. Each container is connected to the one adjoining by a single strip or connector which overlaps the top portion of the former and the bottom portion of the latter. The adjoining container and the one next adjoining are connected by a similar strip on the opposite sides of the containers. It will be readily seen that by adjoining containers being connected by a single strip or connector, and every other strip being affixed to opposite sides of the containers, each connector may be folded upon itself so that the containers may stand on their ends in a row, as is shown in Fig. 2. This feature enables the containers to be packed in a small carton for convenient handling and shipping.

It is obvious that when the containers are in the position shown in Figs. 1 and 2, every other cell is inverted. By lifting the cell at the end of the row, the following cells will automatically assume the proper order of contact as is shown in dotted lines. This feature eliminates the annoyance and inconvenience of improper contact in the assembling of batteries.

In order to pack a series of single cells provided with containers embodying the invention, in a carton 13, and maintain an unbroken connection between all the containers, the containers at the ends of each row 14 are connected to the following containers by means of a strip or connector 12' affixed in the usual manner, but at right angles relative to the strips 12. It will be readily seen that such an arrangement of the connectors enables a quantity of single cells to be packed in rows in a carton and a continuous connection maintained in the series.

It is pointed out that battery cell containers constructed in accordance with the invention provide simple, efficient, and economical means for distributing flashlight batteries to the trade. The strips or connectors may be readily severed with a knife, scissors or the like to provide batteries of various cell lengths. The cells will automatically essemble in proper contact order, and the assembled battery may be readily tested with any type of flashlight battery tester. By the cells in the series being of the same date of manufacture, the invention overcomes the danger of assembling a battery with a weak cell.

Various changes as well as modifications may be made without departing from the spirit of the invention.

What I claim, is:

1. In battery cell containers, a plurality of cylindrical tubes, said tubes being arranged end to end in a longitudinal series, and flexible connectors connecting the tubes and adapted to be folded upon themselves, whereby the tubes may be arranged in a row transversely of themselves.

2. A plurality of tubular battery cell containers, each enclosing a cell and connected in articulated relation.

3. A plurality of tubular battery cell containers, each enclosing a storage battery cell and connected in articulated relation, whereby said containers are adapted to be folded upon themselves in parallel relation or alined with their cells in contact.

4. A plurality of battery cell containers, each comprising a tube and enclosing a battery cell, and means for hinging the tubes together, said hinging means being disposed in staggered relation, whereby the containers may be folded into parellel relation.

5. A battery cell package, comprising a plurality of tubular containers, each containing a battery with its terminals exposed, and means for hinging said containers together whereby they may be unfolded into parallel relation or folded into alinement with the terminals of their batteries in contact.

6. A battery cell package, comprising a plurality of tubular containers, each containing a battery cell and disposed in longitudinal alinement, and separate flexible strips fastening the ends of the containers together.

7. A battery cell package, comprising a plurality of tubular containers, each containing a battery cell and disposed in longitudinal alinement, and flexible strips in staggered relation fastening the ends of the containers together, one of said strips being disposed at right angles to the other strips with relation to the circumference of the container, whereby the end container may be folded at right angles with relation to the other containers and thereby brought into parallel relation with said containers.

In testimony whereof I affix my signature.

ALVIN I. FOLSOM.